Dec. 8, 1925.
H. P. KRAFT
PIPE COUPLING
Filed April 21, 1923
1,564,965
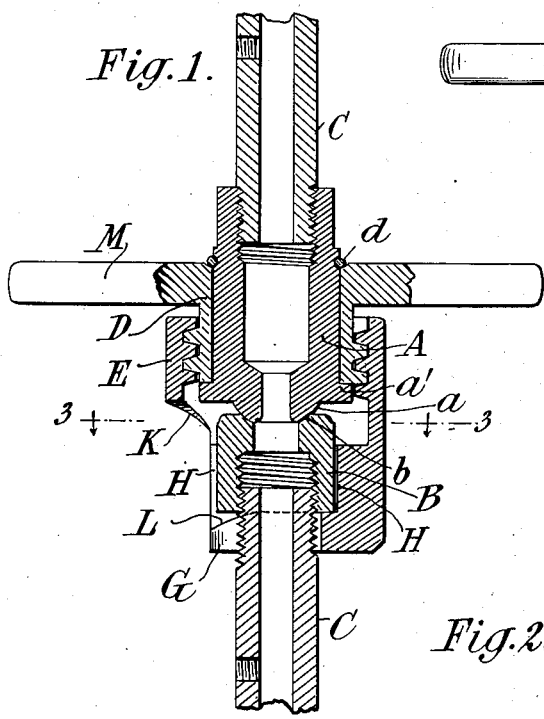
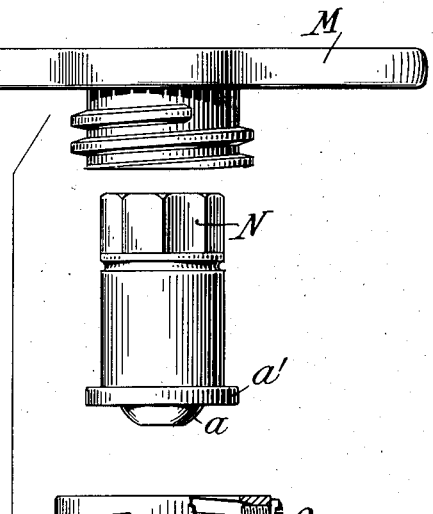
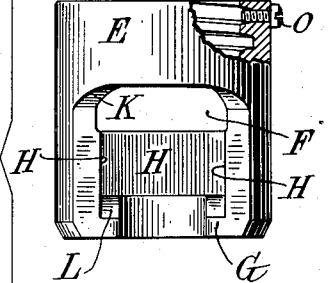
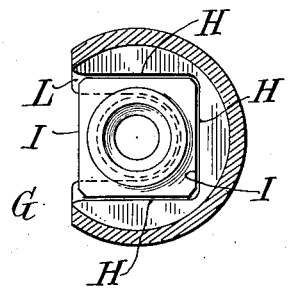
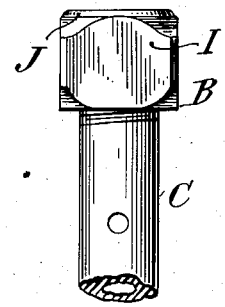
INVENTOR:
Henry Phillip Kraft,
By Attorneys,
Fraser, Turk & Myers Patented Dec. 8, 1925.

1,564,965

UNITED STATES PATENT OFFICE.

HENRY PHILLIP KRAFT, OF RIDGEWOOD, NEW JERSEY; EDGAR J. PHILLIPS AND EARL A. DARR EXECUTORS OF THE WILL OF HENRY P. KRAFT, DECEASED.

PIPE COUPLING.

Application filed April 21, 1923. Serial No. 633,707.

*To all whom it may concern:*

Be it known that I, HENRY PHILLIP KRAFT, a citizen of the United States of America, residing in Ridgewood, in the county of Bergen and State of New Jersey, have invented certain new and useful Improvements in Pipe Couplings, of which the following is a specification.

This invention relates to pipe couplings, and is more especially directed for use in connection with manifold connections in vulcanizing apparatus.

Such manifold couplings usually comprise a quickly operable coupling designed to connect together the ingress pipes of a series of vulcanizing moulds as the latter are placed in the vulcanizing press, and thereby connect up the steam supply pipe with the individual moulds. Because of the repeated coupling and uncoupling operations and the high heat and pressure involved, such couplings are made with a metal to metal joint, which for successful operation must be absolutely steam-tight.

The principal object of the present invention is to provide a coupling of this kind which can be easily and quickly operated and which will maintain the couplings in efficient steam-tight connection at all times.

Another object is to provide a coupling which will permit the coupling operation to be performed after a mould is set on the floor of the press or on its next preceding mould.

A further object of the invention is to provide a coupling wherein the coupling members have the capacity take up and compensate for wear on their seating faces.

According to the present invention I accomplish the foregoing objects and others not specifically enumerated by providing a coupling having two complemental members, and means for connecting said members comprising two relatively movable parts carried by one of the members, one of said parts being adapted to laterally receive the other member and hold it against rotation, and the relatively movable parts being connected together by a quick acting thread or its equivalent.

In the accompanying drawings wherein I have shown a preferred embodiment of my invention:—

Figure 1 is a diametrical longitudinal section of the coupling.

Fig. 2 is an elevation of the component parts of the coupling.

Fig. 3 is a section taken on the line 3—3 of Fig. 1.

Referring to the drawings, let A and B indicate a pair of coupling members each carried by a pipe section C, to which are adapted to be connected the ingress pipes connecting with a series of vulcanizing moulds (not shown). The members A and B are formed with complemental seating faces $a$ and $b$, respectively, which are preferably tapered or conical in form, as herein shown.

For connecting the members together there are provided the parts D and E which encircle the member A and are carried thereon. The parts D and E are adapted for relative longitudinal and rotational movement with respect to each other and the member A is likewise adapted for both longitudinal and rotational movement with respect to the part E but only rotational movement with respect to the part D. In other words, the part D is swiveled on the member A and has a screw threaded connection or its equivalent with the part E. The part D is held in swiveled relation on the member A through the medium of a lateral flange $a'$ adjacent the lower end of the member A overlying the end of the part D, and a split spring ring $d$ positioned in an annular groove in the member A overlying the top of the part D.

The part E is formed as a housing having an opening F in its side and an inturned flange G at its bottom and is adapted to laterally receive the coupling member B through said opening and hold it against rotation. This latter function is accomplished through cooperating parts on B and E which, as herein shown, are in the nature of flat surfaces H on the interior of the housing E and correspondingly flat faces I on the exterior of the member B.

To facilitate the introduction and removal of the coupling member B into the housing E the top and bottom edges of the member B are chamfered or beveled, as shown at J, and the top of the opening in the housing and the top surface of the flange G at the opening are chamfered, as indicated by the reference characters K and L, respectively.

In the operation of the device the member B is laterally slipped into the opening F in the housing and the complemental seating faces *a* and *b* are forced into engagement by applying a turning force to the part D through its manipulating handle M. It is preferable that the coupling operation be accomplished through but a slight or partial rotation of the handle M, say about 90°, and for this reason the screw threads on the parts D and E are coarse or quick-acting. In practice a perfect steam-tight joint between the seating faces is obtained by tapping the handle M with a heavy hammer. This, of course, gives rise to wear on the seating faces, which wear must be compensated for if a steam-tight connection is to be maintained. According to the present invention such wear is taken up by the quick-acting screw threads on the parts D and E, one convolution of said thread providing a substantial longitudinal movement of the member B. In this way supplemental wear compensating means, such as cams, movable collars, or other adjustments, are dispensed with.

When the coupling is used in conjunction with manifold connections in vulcanizing apparatus it will be appreciated that the present device will permit the coupling operation to be performed after a mould is set on the floor of a press or on its next preceding mould inasmuch as the coupling operation is carried out through an initial relative lateral movement of the coupling members, instead of a longitudinal movement which requires a careful initial alinement of the coupling members. The ingress pipe carried by the pipe section of the coupling can be readily turned to connect with a mould after the coupling members are in position but before being clamped because of the swivel connection between the member A and the part D. The turning of this member may be accomplished through engagement with the wrench faces on the member A. To prevent the separation of the parts D and E when uncoupling, a set screw O may be employed to engage the end of the thread on the member D to limit its outward movement.

While I have shown and described the preferred embodiments of my invention it will be understood various changes and modifications may be resorted to without departing from the spirit of the invention.

What I claim is:

1. In a coupling, two complemental members having co-operating seating faces adapted for limited relative longitudinal movement, a housing carried by one of the members adapted to laterally receive through its side the other member, the internal wall of the housing and the external wall of the second member having co-operating surfaces for preventing relative rotation between the housing and said second member when the complemental members are moved longitudinally with respect to one another, and means on the housing adapted to co-operate with both members to cause such relative longitudinal movement, said means comprising a sleeve swiveled to the first member and having a screw-threaded connection with the housing.

2. A coupling comprising two complemental members having cooperating seating faces which are normally protected against injury, and a housing having an opening in its side carried by one of said members and adapted to laterally receive through said opening the other member and hold it against relative rotation with respect thereto, but adapted to permit longitudinal movement of said members, the edges defining the opening in the housing wall being tapered inwardly to facilitate the entrance of the member, and means on the housing adapted to cooperate with both members to move their seating faces into engagement, said means comprising a sleeve swiveled to one of the complemental members and means to prevent longitudinal motion between said sleeve and complemental member.

In witness whereof, I have hereunto signed my name.

HENRY PHILLIP KRAFT.